United States Patent
Takubo et al.

(10) Patent No.: US 7,069,719 B2
(45) Date of Patent: Jul. 4, 2006

(54) AIR-FUEL RATIO CONTROL APPARATUS FOR AN INTERNAL COMBUSTION ENGINE

(75) Inventors: Hideki Takubo, Tokyo (JP); Akira Demizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 43 days.

(21) Appl. No.: 11/001,342

(22) Filed: Dec. 2, 2004

(65) Prior Publication Data

US 2005/0284130 A1    Dec. 29, 2005

(30) Foreign Application Priority Data

Jun. 24, 2004    (JP) .............................. 2004-186498

(51) Int. Cl.
*F01N 3/00*    (2006.01)

(52) U.S. Cl. ............................ 60/285; 60/276; 60/277; 60/301; 701/103

(58) Field of Classification Search ................. 60/274, 60/276, 277, 285, 301; 701/103, 109
See application file for complete search history.

(56) References Cited

U.S. PATENT DOCUMENTS

| | | | |
|---|---|---|---|
| 5,755,212 A * | 5/1998 | Ajima ......................... | 123/674 |
| 6,351,943 B1 * | 3/2002 | Tagami et al. ................. | 60/285 |
| 6,502,388 B1 * | 1/2003 | Takaku et al. ................. | 60/285 |
| 6,539,705 B1 * | 4/2003 | Beer et al. .................... | 60/274 |
| 6,594,988 B1 * | 7/2003 | Takubo et al. ................. | 60/285 |
| 6,739,122 B1 * | 5/2004 | Kitajima et al. .............. | 60/277 |

FOREIGN PATENT DOCUMENTS

| | | |
|---|---|---|
| DE | 42 15 942 C2 | 12/1992 |
| DE | 101 63 058 A1 | 7/2003 |
| EP | 0 844 374 B1 | 5/1998 |
| EP | 0 844 379 B1 | 5/1998 |
| EP | 1 128 045 A2 | 8/2001 |
| JP | 2-67443 A | 3/1990 |
| JP | 3-217633 A | 9/1991 |
| JP | 05-321653 A | 7/1993 |
| JP | 6-42387 A | 2/1994 |
| JP | 06-042387 A | 2/1994 |
| JP | 2001-234789 A | 8/2001 |

* cited by examiner

*Primary Examiner*—Binh Q. Tran
(74) *Attorney, Agent, or Firm*—Sughrue Mion, PLLC

(57) ABSTRACT

To obtain an air-fuel ration control apparatus for an internal combustion engine capable of maintaining an NOx purification rate at a high level when a catalyst is in a deteriorated condition. The air-fuel ratio control apparatus includes: an oxygen concentration sensor for detecting an oxygen concentration at a position upstream of a catalyst; an oxygen concentration sensor for detecting an oxygen concentration at a position downstream of the catalyst; an injector drive unit for adjusting an amount of a fuel supplied to an internal combustion engine; a first air-fuel ratio control unit for controlling the injector drive unit such that the air fuel ratio at the position upstream of the catalyst matches a first target air-fuel ratio; a second air-fuel ratio control unit for setting the first target ratio such that the air fuel ratio at the position downstream of the catalyst matches a second target air-fuel ratio; and a target air-fuel ratio setting unit for setting the second target air-fuel ratio. The target air-fuel ratio setting unit sets the second target air-fuel ratio at a value on a rich side of a stoichiometric air-fuel ratio such that an NOx purification rate is a maximum in view of NOx purification rate characteristics when the catalyst is in a deteriorated condition.

4 Claims, 15 Drawing Sheets

AIR-FUEL RATIO CONTROL APPARATUS FOR AN INTERNAL COMBUSTION ENGINE

BACKGROUND OF THE INVENTION

1. Field of the Invention

The present invention relates to an air-fuel ratio control apparatus for an internal combustion engine. For example, the air-fuel ratio control apparatus is mounted in a vehicle. In particular, the present invention relates to a technique for maintaining purification ratio of NOx at a high level even if a three-way catalyst is deteriorated.

2. Description of the Related Art

A conventional air-fuel ratio control apparatus includes: a three-way catalyst (hereinafter, simply referred to as "catalyst") provided in an exhaust passage of an internal combustion engine for purifying HC, CO, and NOx in an exhaust gas at the same time; a first air-fuel ratio sensor for detecting a first air-fuel ratio at a position upstream of the catalyst; a second air-fuel ratio sensor for detecting a second air-fuel ratio at a position downstream of the catalyst; and a controller for controlling the air-fuel ratio. An oxygen storage amount of the catalyst is calculated based on the first air-fuel ratio and an intake air amount for controlling the air-fuel ratio for the internal combustion engine such that the oxygen storage amount matches a target oxygen storage amount (for example, see JP 2001-234789 A).

Operation of the conventional apparatus will be described.

As well known in the art, purification performance of the catalyst is high near the stoichiometric air-fuel ratio. If an operating point deviates from the stoichiometric air-fuel ratio, its purification efficiency lowers. Therefore, in order to address a problem due to temporal deviation of the air-fuel ratio, the catalyst has an oxygen storage capacity.

With the oxygen storage capacity, the catalyst takes in the oxygen in the exhaust gas when the operation is carried out on a lean side of the stoichiometric air-fuel ratio, so the catalytic atmosphere can be maintained at the stoichiometric air-fuel ratio until the oxygen storage amount is saturated.

The catalyst releases the oxygen when the operation is carried out on a rich side of the stoichiometric air-fuel ratio, so the catalytic atmosphere can be maintained at the stoichiometric air-fuel ratio.

The controller calculates the amount of oxygen absorbed into or released from the catalyst by integration based on an excess oxygen rate determined by conversion from the first air-fuel ratio and the intake air amount at this point. The controller controls the oxygen storage amount to a target oxygen storage amount for maintaining the catalytic atmosphere at the stoichiometric air-fuel ratio.

Further, since the first air-fuel ratio sensor is exposed in high temperature exhaust air, fluctuation occurs in outputs of the detection signal. In order to correct the fluctuation, the controller corrects the deviation from the stoichiometric air-fuel ratio using the second air-fuel ratio sensor, and keeps the air-fuel ratio at a position downstream of the catalyst at the stoichiometric air-fuel ratio.

Next, description will be made of purification characteristics for HC and NOx when the catalyst is in a new condition, and in a deteriorated condition.

For example, when the catalyst is in the new condition, and when the air-fuel ratio detected by the second air-fuel ratio sensor is near the stoichiometric air-fuel ratio, the HC purification rate is a maximum state. The HC purification ratio decreases as the air-fuel ratio further deviates from the stoichiometric air-fuel ratio toward the rich side or the lean side. However, the margin of the decreased purification ratio is small, and the HC purification rate has substantially flat characteristics.

On the other hand, when the air-fuel ratio is near the stoichiometric air-fuel ratio, the NOx purification rate is the maximum. The NOx purification rate reduces gradually on the rich side, and reduces sharply on the lean side.

As the deterioration of the catalyst progresses, the HC purification rate lowers in comparison with the HC purification rate when the catalyst is in the new condition. However, the purification rate is high when the air-fuel ratio is near the stoichiometric air-fuel ratio.

On the other hand, the NOx purification rate reduces significantly when the air-fuel ratio is not near a predetermined value (on the rich side of the stoichiometric air-fuel ratio). Even if the air-fuel ratio is near the stoichiometric air-fuel ratio, the purification rate reduces significantly.

In consideration of the NOx purification characteristics in correspondence with the deterioration level of the catalyst, as the deterioration level increases, the purification rate at the air-fuel ratio deviated from the predetermined value reduces much more. Even if the air-fuel ratio is near the stoichiometric air-fuel ratio, the purification rate reduces significantly.

As a result, when the air-fuel ratio is at the stoichiometric air-fuel ratio, if the catalyst is in the new condition, the nearly maximum NOx purification ratio is maintained. However, as the deterioration of the catalyst progresses, the NOx purification rate reduces significantly.

That is, when the catalyst is in the new condition, the purification rates of HC, CO, and NOx are designed to be high as long as the air-fuel ratio is near the stoichiometric air-fuel ratio. However, in the actual condition in use, the purification performance of the catalyst lowers owing to the deterioration of the catalyst due to various factors.

For example, hot exhaust air is a thermal deterioration factor. Since the particle structure of noble metals such as platinum, palladium, and rhodium in the catalyst deforms gradually, the purification performance of the noble metals lowers.

Further, components in the fuel such as lead, sulfur, and phosphor are poisonous deterioration factors. Those components are attracted to the noble metals, and the noble metals are poisoned. Therefore, the purification performance of the noble metals lowers.

That is, in the conventional apparatus, since the air-fuel ratio at a position downstream of the catalyst is controlled at the stoichiometric air-fuel ratio, the purification rate is kept at a high level when the catalyst is in the new condition. However, when the deterioration of the catalyst progresses, it is not possible to maintain the initial purification performance.

In the conventional air-fuel ratio control apparatus for an internal combustion engine, since the air-flow ratio at a position downstream of the catalyst is controlled at the stoichiometric air-fuel ratio, when the catalyst is in the new condition, the high purification ratio is maintained for each of HC and NOx. However, if the catalyst is in the deteriorated condition, the high purification rate is maintained for HC, but the NOx purification ratio reduces significantly.

SUMMARY OF THE INVENTION

The present invention has been made to solve the problems described above, and an object of the present invention is therefore to provide an air-fuel ratio control apparatus for an internal combustion engine which is capable of maintaining an NOx purification rate at a high level even if a catalyst is in a deteriorated condition.

According to the present invention, there is provided an air-fuel ratio control apparatus for an internal combustion engine, including: a catalyst, which is disposed in an exhaust air system for the internal combustion engine, for removing a toxic substance from an exhaust gas; a first oxygen concentration sensor for detecting a first oxygen concentration in the exhaust gas at a position upstream of the catalyst; a second oxygen concentration sensor for detecting a second oxygen concentration in the exhaust gas at a position downstream of the catalyst; an injector for supplying a fuel to the internal combustion engine; injector drive means for adjusting an amount of the fuel supplied from the injector to the internal combustion engine; first air-fuel ratio control means for controlling the injector drive means such that a first air-fuel ratio corresponding to a detection signal from the first oxygen concentration sensor matches a first target air-fuel ratio; second air-fuel ratio control means for setting the first target air-fuel ratio such that a second air-fuel ratio corresponding to a detection signal from the second oxygen concentration sensor matches a second target air-fuel ratio; and target air-fuel ratio setting means for setting the second target air-fuel ratio, in which: the target air-fuel ratio setting means stores a first predetermined value based on NOx purification characteristics of the catalyst depending on the air-fuel ratio in the exhaust air system for the internal combustion engine; and the target air-fuel ratio setting means sets the second target air-fuel ratio at the first predetermined value on a rich side of a stoichiometric air-fuel ratio such that an NOx purification rate is a maximum when the catalyst is in a deteriorated condition.

According to the present invention, the NOx purification rate can be maintained at a high level even if the catalyst is in a deteriorated condition.

DESCRIPTION OF THE PREFERRED EMBODIMENTS

First Embodiment

Hereinafter, a first embodiment of the present invention will be described with reference to the drawings.

Figure 1:
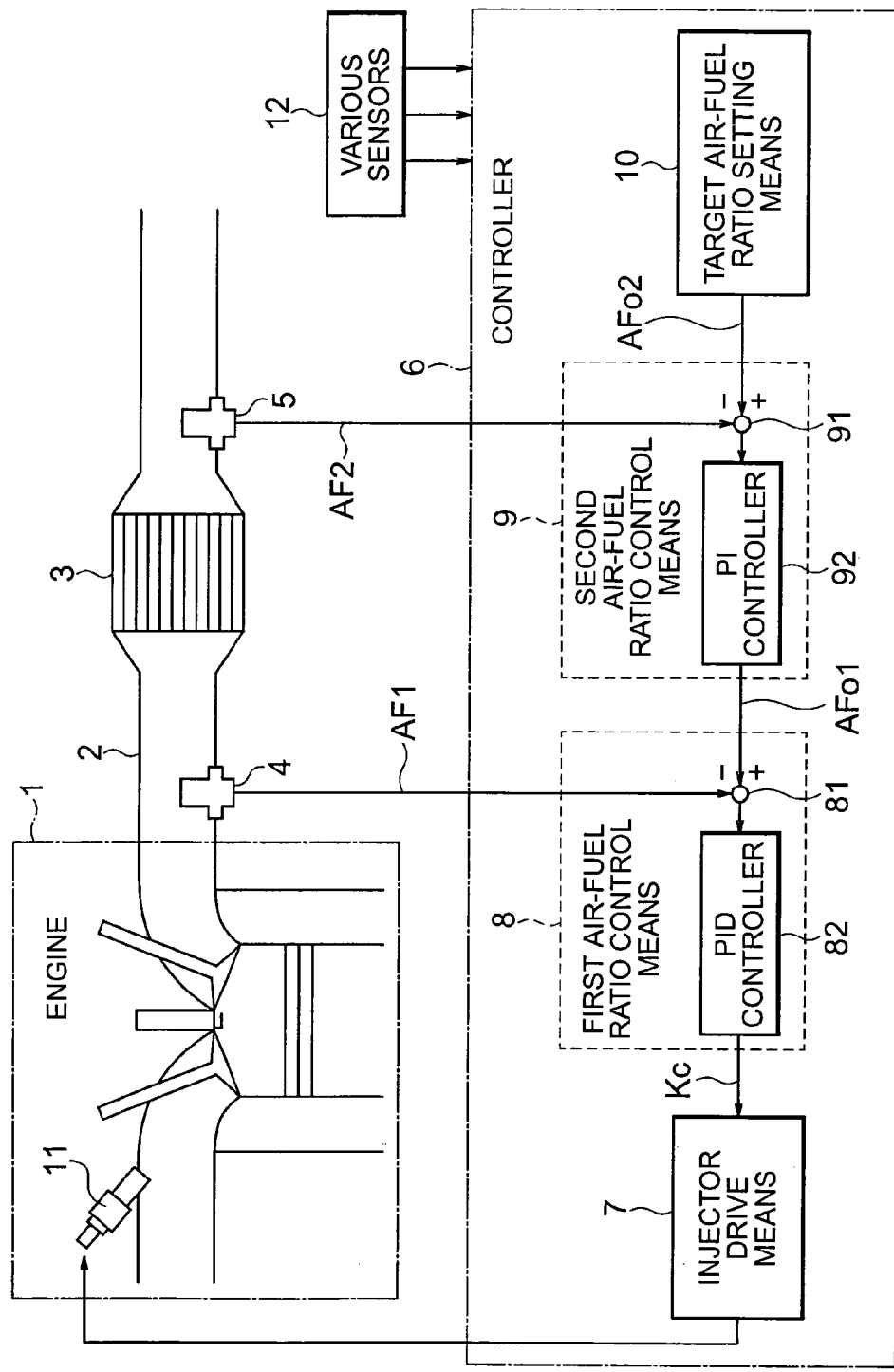
FIG. 1 is a block diagram showing an air-fuel control apparatus for an internal combustion engine according to a first embodiment of the present invention.

FIG. 1 is a block diagram showing an air-fuel ratio control apparatus for an internal combustion engine according to the first embodiment of the present invention.

In FIG. 1, a catalyst 3 is disposed in an exhaust pipe 2 of an engine 1 as the internal combustion engine. The catalyst 3 removes a toxic substance in the exhaust gas.

An injector 11 for supplying a fuel to the engine 1 is disposed in an air intake pipe of the engine 1.

A linear oxygen concentration sensor (hereinafter simply referred to as the "oxygen concentration sensor") 4 is disposed at a position upstream of the catalyst 3 as a first oxygen concentration sensor.

The oxygen concentration sensor 4 detects a first oxygen concentration in the exhaust gas at the position upstream of the catalyst 3, and outputs a detection signal corresponding to a first air-fuel ratio AF1.

A second oxygen concentration sensor (hereinafter simply referred to as the "oxygen concentration sensor") 5 is disposed at a position downstream of the catalyst 3.

The oxygen concentration sensor 5 detects a second oxygen concentration in the exhaust gas at the position downstream of the catalyst 3, and outputs a detection signal corresponding to a second air-fuel ratio AF2.

The detection signals from the oxygen concentration sensor 4 and the oxygen concentration sensor 5 are inputted to a controller 6.

Further, various sensors 12 for detecting the operating condition of the engine 1 are provided for the engine 1. Detection signals from the various sensors 12 are inputted to the controller 6.

The controller 6 includes components such as a microprocessor, a ROM, a RAM, and an I/O interface. The controller 6 generates a drive control signal based on the detection signals corresponding to the first and second air-flow ratios AF1, AF2, and detection signals (operating condition) from the various sensors 12, and inputs the drive control signal to the injector 11 for controlling the air-fuel ratio of the fuel supplied to the engine 1.

The controller 6 includes: injector drive means 7 for generating the drive control signal inputted to the injector 11; first air-fuel ratio control means 8 for generating a fuel correction coefficient Kc inputted to the injector drive means 7; second air-fuel ratio control means 9 for setting a first target air-fuel ratio AFo1 inputted to the first air-fuel ratio control means 8; and target air-fuel ratio setting means 10 for setting a second target air-fuel ratio AFo2 inputted to the second air-fuel ratio control means 9.

The injector drive means 7 drives the injector 11 in accordance with the fuel correction coefficient Kc, and adjusts the supply of the fuel to the engine 1.

The first air-fuel ratio control means 8 generates the fuel correction coefficient Kc such that the first air-fuel ratio AF1 corresponding to the detection signal from the oxygen concentration sensor 4 matches the first target air-fuel ratio AFo1, and controls the injector drive means 7.

The second air-fuel ratio control means 9 sets the first target air-fuel ratio AFo1 such that the second air-fuel ratio AF2 corresponding to the detection signal from the oxygen concentration sensor 5 matches the second target air-fuel ratio AFo2.

The target air-fuel ratio setting means 10 stores a first predetermined value based on the NOx purification rate characteristics of the catalyst 3 depending on the air-fuel ratio of the exhaust air system of the engine 1. The second target air-fuel ratio AFo2 is set at the first predetermined value which is on the rich side of the stoichiometric air-fuel ratio (=14.7), and which achieves the maximum NOx purification rate even if the catalyst 3 is deteriorated.

Specifically, the target air-fuel ratio setting means 10 sets a voltage value which achieves the maximum NOx purification rate of the catalyst 3 as a reference voltage value which is compared with the detection signal (output voltage) from the oxygen concentration sensor 5. The reference voltage valve is set as the second target air-fuel ratio AFo2.

The second air-fuel ratio control means 9 includes a subtracter 91 and a PI controller 92.

The subtracter 91 compares the detection signal from the oxygen concentration sensor 5 indicating the second air-fuel ratio AF2 with the second target air-fuel ratio AFo2 to calculate an air-fuel ratio deviation between the second air-fuel ratio AF2 and the second target air-fuel ratio AFo2 (AFo2−AF2).

The PI controller 92 performs PI control of the second air-fuel ratio deviation calculated by the subtracter 91 to calculate the first target air-fuel ratio AFo1.

The first air-fuel ratio control means 8 includes a subtracter 81 and a PID controller 82.

The subtracter 81 compares the detection signal indicating the first air-fuel ratio AF1 with the first target air-fuel ratio AFo1 to calculate an air-fuel ratio deviation between the first air-fuel ratio AF1 and the first target air-fuel ratio AFo1 (AFo1−AF1).

The PID controller 82 performs PID control of the first air-fuel ratio deviation calculated by the subtracter 81 to calculate the fuel correction coefficient Kc.

Figure 2:
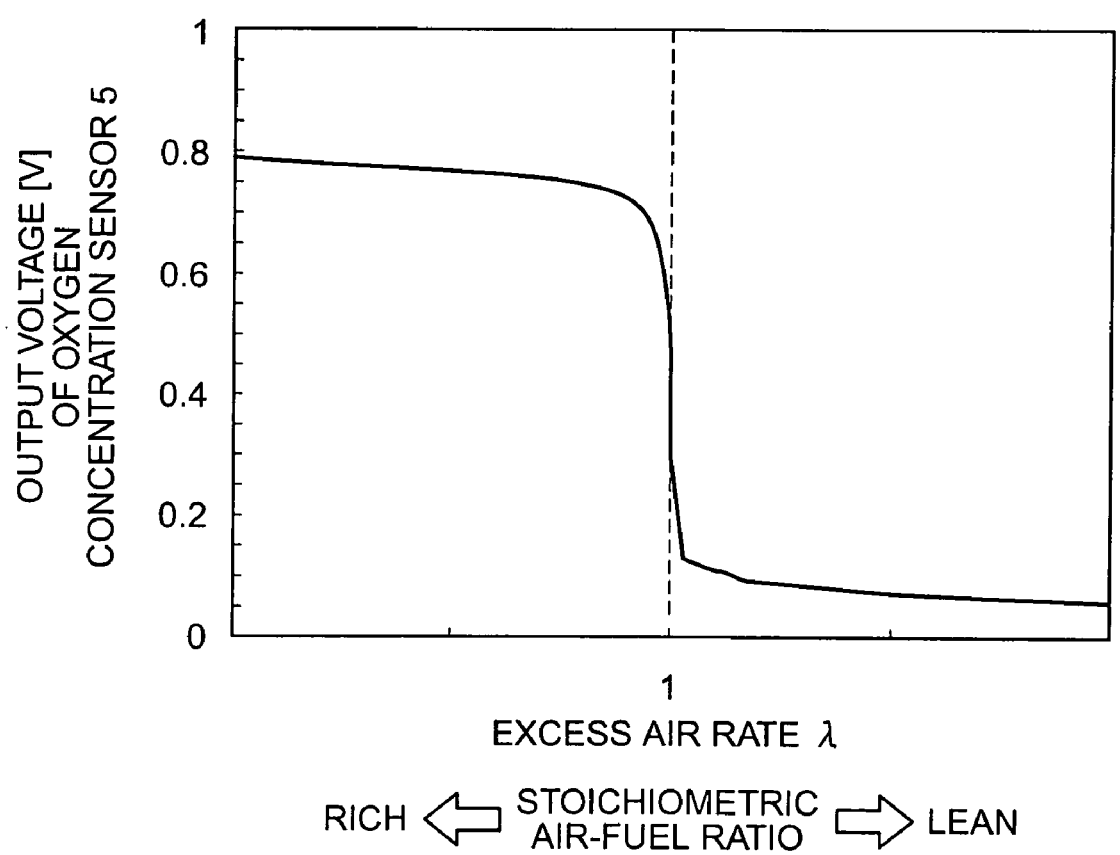
FIG. 2 is a graph showing output voltage characteristics of an oxygen concentration sensor (λ-sensor) disposed at a position downstream of a catalyst.

FIG. 2 is a graph showing characteristics of the output voltage [V] of the oxygen concentration sensor (λ-sensor) 5 disposed at the position downstream of the catalyst 3.

In FIG. 2, the output voltage of the oxygen concentration sensor 5 has two-value characteristics for the change of the air-fuel ratio in the sensor atmosphere where the output voltage changes sharply near the stoichiometric air-fuel ratio (excess air ratio λ=1).

That is, the output voltage of the oxygen concentration sensor 5 is about 0.8 V on the rich side of the air-fuel ratio, and about 0.1 V on the lean side of the air-fuel ratio.

Figure 3:
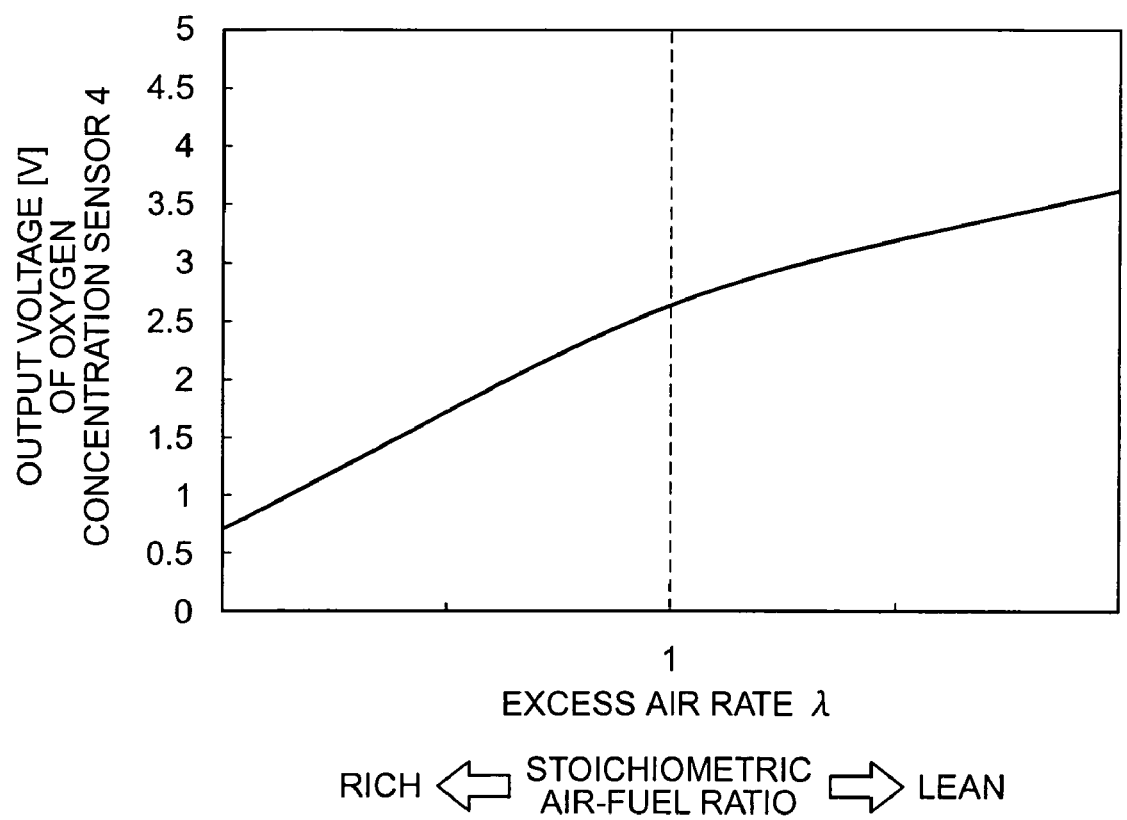
FIG. 3 is a graph showing output voltage characteristics of an oxygen concentration sensor (linear sensor) disposed at a position upstream of the catalyst.

FIG. 3 is a graph showing characteristics of the output voltage [V] of the oxygen concentration sensor (linear sensor) 4 disposed at the position upstream of the catalyst 3.

In FIG. 3, the output voltage of the oxygen concentration sensor 4 has linear characteristics for the change of the air-fuel ratio in the sensor atmosphere.

That is, the output voltage of the oxygen concentration sensor 4 is about 2.5 V at the stoichiometric air-fuel ratio, about 0.5 V on the minimum value side (rich side) of the air-fuel ratio, and about 3.5 V on the maximum value side (lean side) of the air-fuel ratio.

Figure 4:
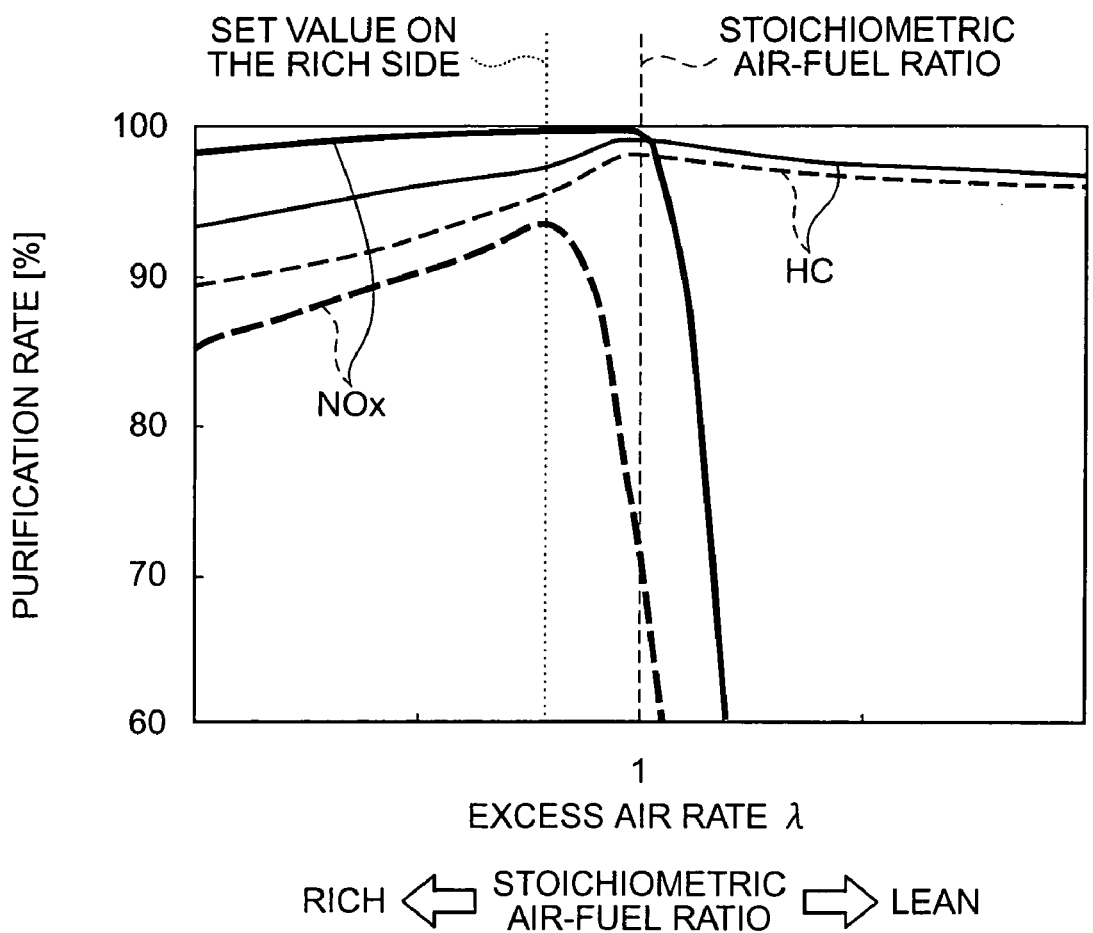
FIG. 4 is a graph showing purification rate characteristics for HC and NOx by the catalyst.

FIG. 4 is a graph showing characteristics of the purification rates [%] for HC and NOx by the catalyst 3. The horizontal axis indicates the air-fuel ratio at the position downstream of the catalyst 3, and the vertical axis indicates the purification rates of the catalyst 3 depending on the air-fuel ratio at the position downstream of the catalyst 3.

In FIG. 4, solid lines are characteristic curves of the catalyst 3 in a new condition, and broken lines are characteristic curves of the catalyst 3 in a deteriorated condition.

As can be seen from FIG. 4, the purification rates of the catalyst 3 are low when the catalyst 3 is deteriorated. The purification rate for NOx reduces sharply on the lean side of the air-fuel ratio regardless of the condition of the catalyst 3.

Figure 5:
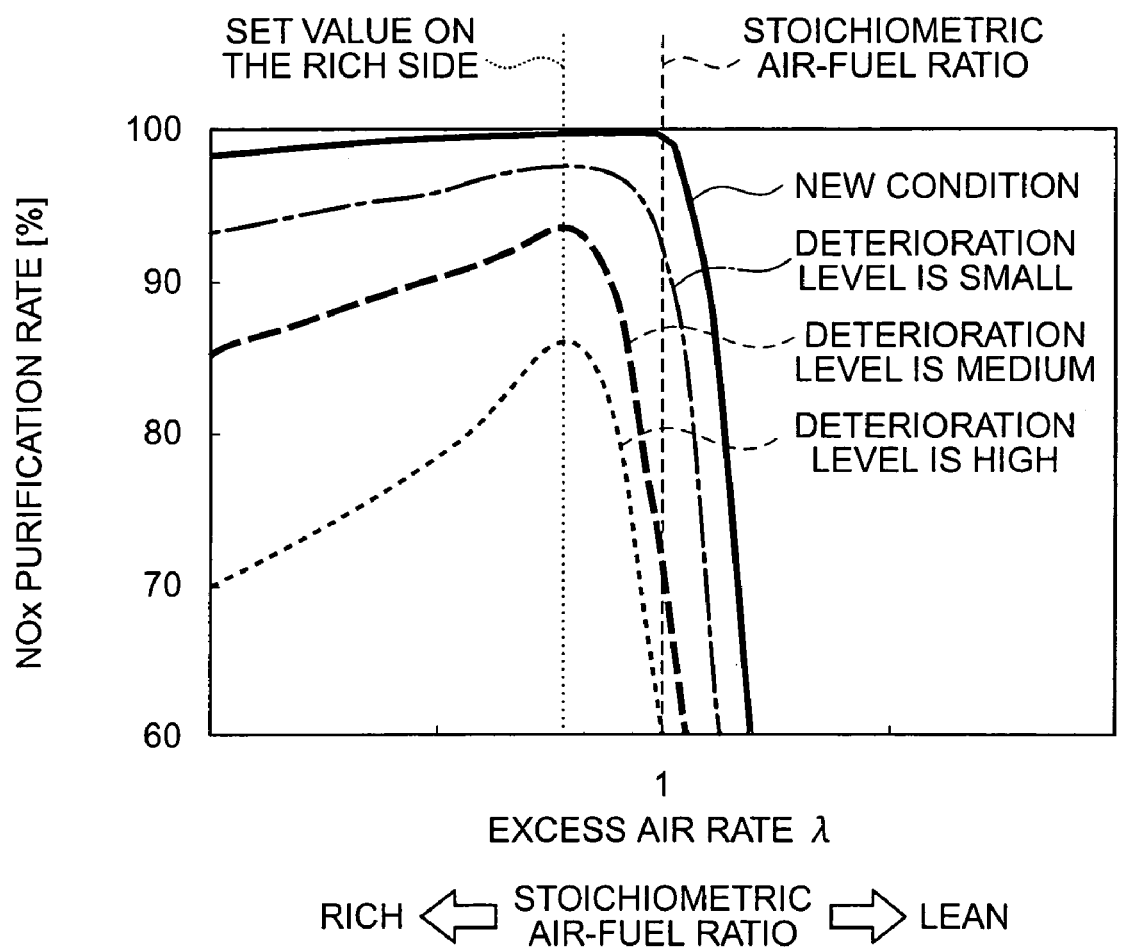
FIG. 5 is a graph showing a change in NOx purification rate characteristics depending on a deterioration level of the catalyst.

FIG. 5 is a graph showing the change in NOx purification rate characteristics depending on the deterioration level of the catalyst 3.

In FIG. 5, a solid line is a characteristic curve of the catalyst 3 in a new condition, a dashed line (alternate long and short dash line) is a characteristic curve of the catalyst 3 in a condition where the deterioration level of the catalyst 3 is low, a broken line is a characteristic curve of the catalyst 3 in a condition where the deterioration level of the catalyst 3 is medium, and a dotted line is a characteristic curve of the catalyst 3 in a condition where the deterioration level of the catalyst 3 is high.

As can be seen from FIG. 5, the purification rate of the catalyst 3 reduces as the deterioration of the catalyst 3 progresses.

Figure 6:
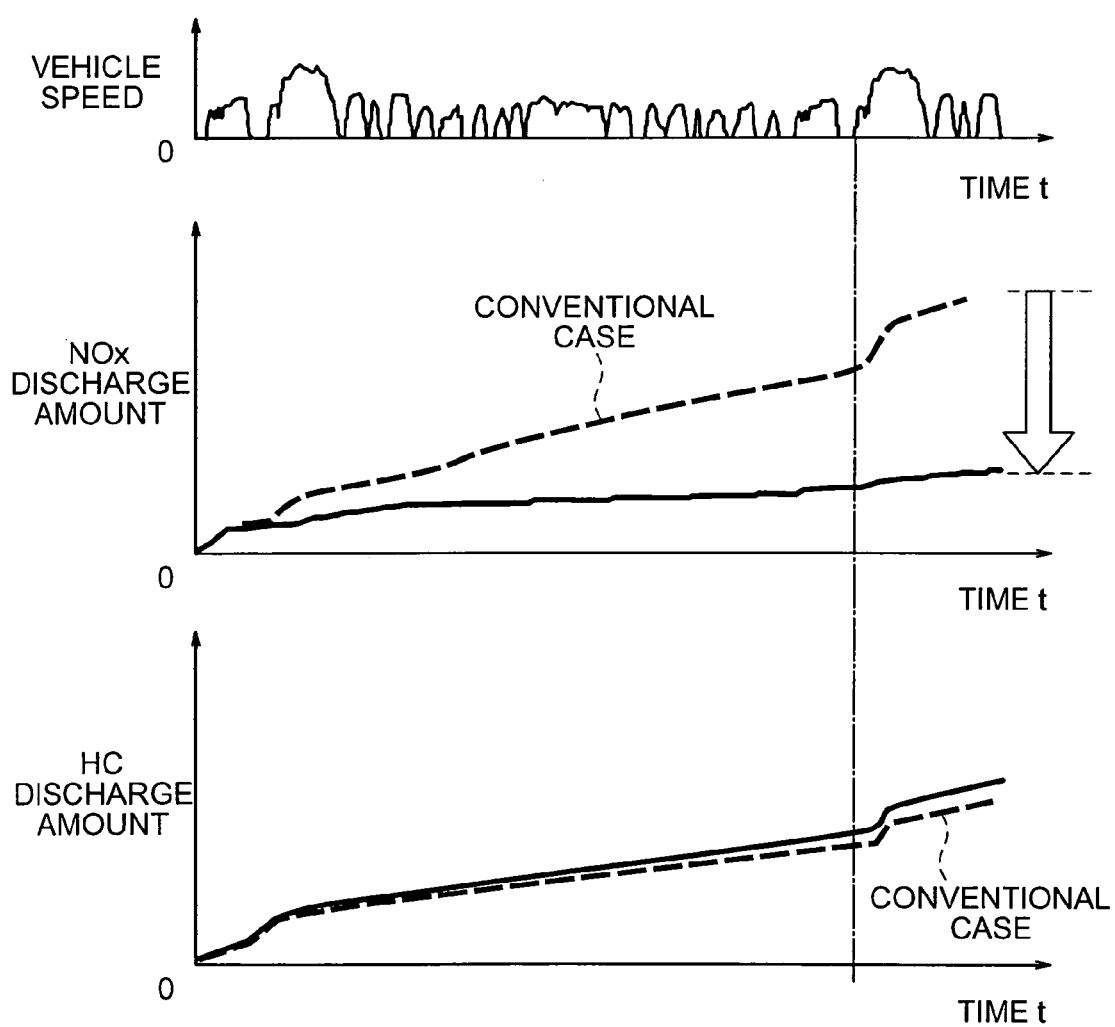
FIG. 6 is a view of graphs showing a discharge amount of HC and a discharge amount of NOx depending on a vehicle speed change during driving of a vehicle when the catalyst is deteriorated.

FIG. 6 is a view of graphs showing the discharge amount of HC and the discharge amount of NOx depending on the vehicle speed change during driving of the vehicle when the catalyst 3 is deteriorated. FIG. 6 shows the change of an actual exhaust amount when the test pattern driving is carried out using the deteriorated catalyst.

In the graphs of FIG. 6, the horizontal axes indicate the lapsed time t, and the vertical axes indicate the vehicle speed (driving speed of the vehicle), the discharge amount (integrated amount) of NOx, and the discharge amount (integrated amount) of HC, respectively. Broken lines indicate the discharge amount of NOx and the discharge amount of HC of a conventional apparatus.

Next, operation of the air-fuel ratio control according to the first embodiment of the present invention shown in FIG. 1 will be described with reference to FIGS. 2 to 6.

During operation of the engine 1, the oxygen concentration sensor 5 disposed at the position downstream of the catalyst 3 inputs the detection signal (second air-fuel ratio AF2) of the output characteristics (see FIG. 2) into the controller 6. The detection signal changes sharply near the stoichiometric air-fuel ratio.

In the controller 6, the detection signal (second air-fuel ratio AF2) from the oxygen concentration sensor 5 is inputted to an inverting input terminal (−) of the subtracter 91 of the second air-fuel ratio control means 9.

Further, the target air-fuel ratio setting means 10 in the controller 6 generates a reference voltage value corresponding to the second target air-fuel ratio AFo2, and inputs the reference voltage value to a non-inverting input terminal (+) of the subtracter 91.

At this time, the reference voltage value (second air-fuel ratio AFo2) from the target air-fuel ratio setting means 10 is set at a value corresponding to a predetermined output voltage value of the oxygen concentration sensor 5.

That is, the reference voltage value is set at the output voltage value (see FIG. 2) corresponding to the predetermined air-fuel ratio (see dotted line in FIG. 4) on the rich side of the stoichiometric air-fuel ratio (where the purification rate for NOx is nearly the maximum).

Even if the catalyst 3 is in the deteriorated condition (see broken lines in FIG. 4), the reference voltage value is inputted to the subtracter 91 as the second target air-fuel ratio AFo2.

Now, the purification rate characteristics (see solid lines) when the catalyst 3 is in the new condition will be described with reference to FIG. 4.

In FIG. 4, the purification rate for HC is high near the stoichiometric air-fuel ratio. As the air-fuel ratio further deviates from the stoichiometric air-fuel ratio toward the rich side or the lean side, the purification rate reduces gradually, and the margin of the purification rate reduced on the lean side and the margin of the purification rate reduced on the rich side are substantially the same. The purification rate has flat characteristics.

In contrast, the purification rate for NOx is high near the stoichiometric air-fuel ratio. The purification rate reduces gradually on the rich side, and reduces sharply on the lean side.

Next, the purification rate characteristics (see broken lines) when the deterioration of the catalyst 3 progresses will be described.

In this case, though the purification rate for HC is relatively low in comparison with the purification rate when the catalyst is in the new condition, the purification rate is maintained at a high level around the stoichiometric air-fuel ratio.

The purification rate for NOx reduces significantly in the air-fuel ratio other than the air-fuel ratio near the predetermined set value (see dotted line) on the rich side of the stoichiometric air-fuel ratio. The purification rate for NOx reduces sharply near the stoichiometric air-fuel ratio.

When the air-fuel ratio is near the set value (see dotted line) on the rich side, regardless of whether the catalyst 3 is in the new condition or in the deteriorated condition, the nearly maximum NOx purification rate is maintained.

As shown in FIG. 5, the purification rate for NOx decreases significantly in the air-fuel ratio other than the air-fuel ratio near the set value (see dotted line) on the rich side of the stoichiometric air-fuel ratio as the deterioration level of the catalyst 3 increases. The purification rate decreases significantly even near the stoichiometric air-fuel ratio.

That is, the purification rate for NOx at the stoichiometric air-fuel ratio is the maximum when the catalyst 3 is in the new condition. However, the purification rate reduces significantly as the deterioration of the catalyst 3 progresses.

On the other hand, in the air-fuel ratio near the set value (see dotted lines in FIGS. 4 and 5) on the rich side of the stoichiometric air-fuel ratio, the nearly maximum NOx purification rate can be maintained regardless of whether the catalyst 3 is in the new condition, and regardless of the deterioration level of the catalyst 3.

In the second air-fuel ratio control means 9, the subtracter 91 calculates the deviation (=AFo2−AF2) between the second target air-fuel ratio AFo2 and the second air-fuel ratio AF2, and inputs the deviation to the PI controller 92 as the second air-fuel ratio deviation.

The PI controller 92 carries out proportion (P) calculation and integration (I) calculation in correspondence with the second air-fuel ratio deviation to set a reference voltage value which operates to offset the second air-fuel ratio deviation. The reference voltage value is inputted to the non-inverting input terminal (+) of the subtracter 81 in the first air-fuel ratio control means 8 as the first target air-fuel ratio AFo1.

In the first air-fuel ratio control means 8, the detection signal (first air-fuel ratio AF1) from the oxygen concentration sensor 4 disposed at the position upstream of the catalyst 3 is inputted to the inverting input terminal (−) of the subtracter 81.

The subtracter 81 calculates the deviation (=AFo1−AF1) between the first target air-fuel ratio AFo1 and the first air-fuel ratio A1, and inputs the deviation to the PID controller 82 as the first air-fuel ratio deviation.

The PID controller 82 carries out proportion (P) calculation, integration (I) calculation, and differentiation (D) calculation in correspondence with the air-fuel ratio deviation to set the fuel correction coefficient Kc which operates to offset the first air-fuel ratio deviation. The PID controller 82 inputs the fuel correction coefficient Kc to the injector drive means 7.

The injector drive means 7 sets the target amount of the fuel supplied to the engine 1 in correspondence with the fuel correction coefficient Kc, and drives the injector 11 by means of a drive control signal corresponding to the target fuel amount.

Thus, the air-fuel ratio of the fuel supplied to the engine 1 is controlled such that the purification rate of the catalyst 3 for NOx is the maximum.

That is, the controller 6 adjusts the first target air-fuel ratio AFo1 such that the deviation between the second target air-fuel ratio AFo2 and the second air-fuel ratio AF2 is eliminated, and adjusts the fuel supply amount such that the deviation between the first target air-fuel ratio AFo1 and the first air-fuel ratio AF1 is eliminated. Consequently, the second air-fuel ratio AF2 at the position downstream of the catalyst 3 matches the second target air-fuel ratio AFo2 under control.

At this time, since the second target air-fuel ratio AFo2 is set to the predetermined value (see dotted lines in FIGS. 4 and 5) on the rich side of the stoichiometric air-fuel ratio, the second air-fuel ratio AF2 is controlled at the set value on the rich side.

Next, the change in the NOx discharge amount when the catalyst 3 is in the deteriorated condition will be described with reference to FIG. 6.

In the above-mentioned conventional apparatus, the air-fuel ratio on the downstream side of the catalyst 3 is controlled at the level near the stoichiometric air-fuel ratio. Therefore, NOx purification performance (see broken line in FIG. 4) at the level near the stoichiometric air-fuel ratio when the catalyst 3 is in the deteriorated condition reduces significantly. The discharge amount of NOx changes as shown in the broken line in FIG. 6.

In contrast, according to the first embodiment of the present invention, the second target air-fuel ratio AFo2 is set at the predetermined value on the rich side. At the set value (see dotted lines in FIGS. 4 and 5) on the rich side, the purification performance of NOx (see broken line in FIG. 4) is maintained at a high level. Therefore, the NOx discharge amount (see solid line in FIG. 6) is reduced to about one third of the NOx discharge amount in the case of the conventional apparatus (see broken line).

Next, the change in the HC discharge amount will be described with reference to FIG. 6.

As shown in FIG. 4, high level HC purification performance is maintained near the stoichiometric air-fuel ratio. Therefore, in the conventional apparatus for controlling the air-fuel ratio to near the stoichiometric air-fuel ratio, the HC discharge amount changes as shown in the broken line in FIG. 6.

In contrast, according to the first embodiment of the present invention, the air-fuel ratio at the position downstream of the catalyst 3 is controlled at the set value on the rich side (see dotted lines in FIGS. 4 and 5). Therefore, as shown in the solid line in FIG. 6, the purification performance for HC is slightly lower than that in the case of the conventional apparatus (see broken line).

However, as shown in FIG. 4, the change in the purification rate characteristics for HC is small. Therefore, as shown in FIG. 6, the increase in the HC discharge amount is minimized.

As described above, the air-fuel ratio control apparatus includes: the oxygen concentration sensors 4, 5 provided at the positions downstream and upstream of the catalyst 3; the injector 11 and the injector drive means 7 for supplying the fuel to the engine 1 to adjust the air fuel ratio; the first air-fuel ratio control means 8 for controlling the air fuel ratio such that the first air-fuel ratio AF1 from the oxygen concentration sensor 4 matches the first target air-fuel ratio AFo1; the second air-fuel ratio control means 9 for controlling the air-fuel ratio such that the second air-fuel ratio AF2 from the oxygen concentration sensor 5 matches the second target air-fuel ratio AFo2; and the target air-fuel ratio setting means 10 for setting the second target air-fuel ratio AFo2. The second target air-fuel ratio AFo2 at the position downstream of the catalyst 3 is set at the predetermined value on the rich side of the stoichiometric air-fuel ratio (the air-fuel ratio where the NOx purification rate of the catalyst 3 is nearly the maximum when the catalyst 3 is in the deteriorated condition). Therefore, the increase in the HC discharge amount when the catalyst 3 is in the deteriorated condition is minimized, and the NOx discharge amount is reduced significantly.

Second Embodiment

In the first embodiment (see FIG. 1), the second target air-fuel ratio AFo2 generated by the target air-fuel ratio setting means 10 has been directly inputted to the second air-fuel ratio control means 9. Alternatively, as shown in FIG. 7, the detection signal (second air-fuel ratio AF2) from the oxygen concentration sensor 5 may be corrected for compensating temperature characteristics, and the corrected value may be inputted to the second air-fuel ratio control means 9 as a corrected target air-fuel ratio AFo2'.

Figure 7:
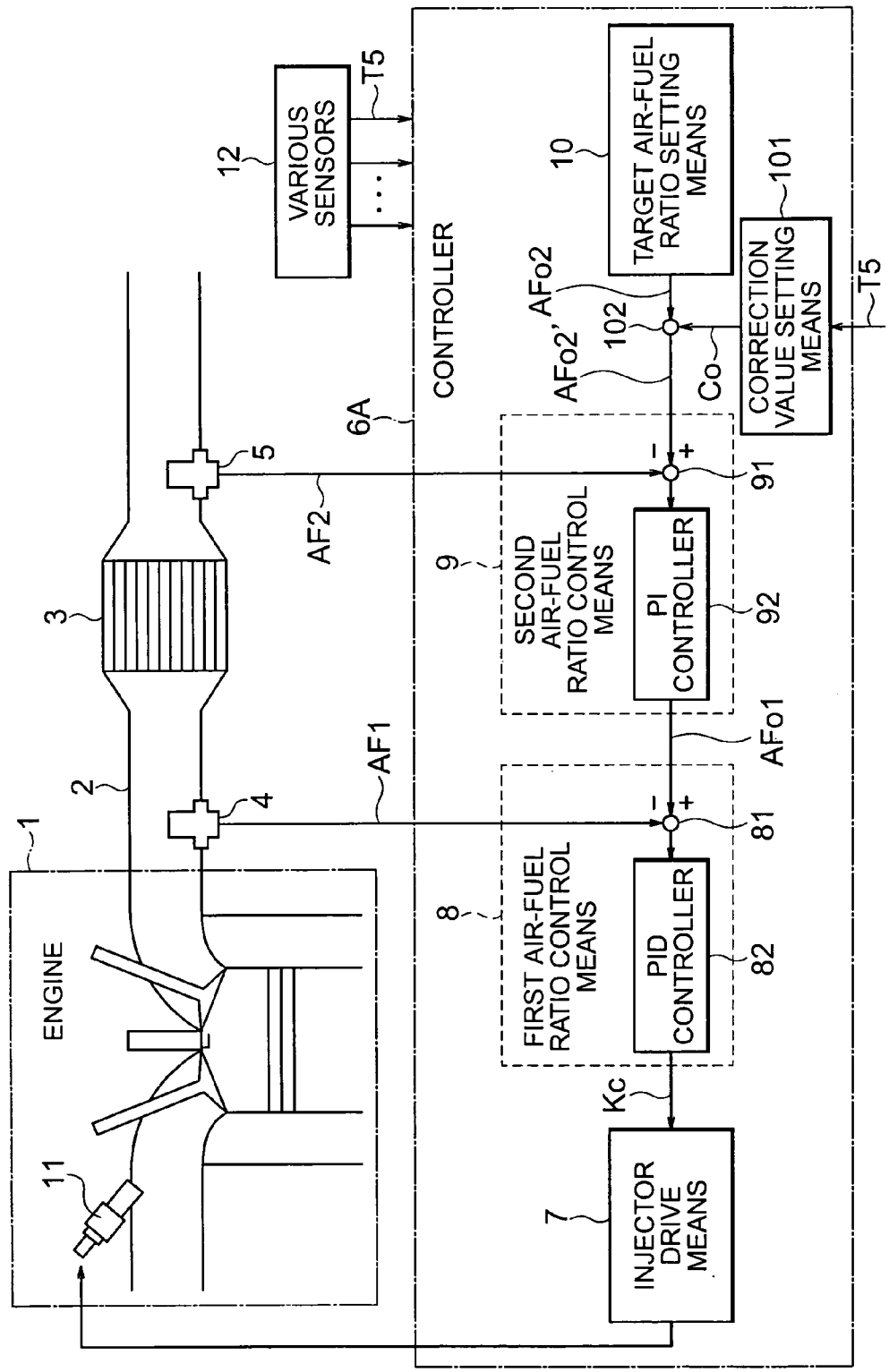
FIG. 7 is a block diagram showing an air-fuel ratio control apparatus for an internal combustion engine according to a second embodiment of the present invention.

FIG. 7 is a block diagram showing an air-fuel ratio control apparatus for an internal combustion engine according to the second embodiment of the present invention. Components that are identical to those described with reference to FIG. 1 are labeled with the same reference numerals, or the same references with "A" at each end, and detailed description thereof will be omitted.

In FIG. 7, the various sensors 12 include a temperature sensor for detecting a device temperature T5 of the oxygen concentration sensor 5 positioned downstream of the catalyst 3. The device temperature T5 detected by the temperature sensor is inputted to a controller 6A together with other operating condition information.

The controller 6A includes correction value setting means 101 and a calculator 102 as target value correction means for generating the target air-fuel ratio AFo2' after correction. The correction value setting means 101 sets a correction value Co of the second target air-fuel ratio AFo2 in correspondence with the device temperature T5 of the oxygen concentration sensor 5. The calculator 102 corrects the second target air-fuel ratio AFo2 using the correction value Co.

The device temperature T5 from the various sensors 12 is inputted to the correction value setting means 101 in the controller 6A.

The correction value setting means 101 stores in advance a second predetermined value based on the temperature characteristics (characteristics indicating the correspondence between the output voltage and the device temperature T5) of the oxygen concentration sensor 5. The correction value setting means 101 generates the correction value Co for correcting the second target air-fuel ratio AFo2. The correction value Co is set to the second predetermined value which offsets the change in temperature of the detection signal (output voltage) of the oxygen concentration sensor 5.

The calculator 102 performs addition, subtraction, or multiplication of the second target air-fuel ratio AFo2 from the target air-fuel ratio setting means 10 using the correction value Co. Then, the calculator 102 inputs the target air-fuel ratio AFo2' after correction for compensating the temperature characteristics of the oxygen concentration sensor 5 into the second air-fuel ratio control means 9.

As a result, the target value correction means 101, 102 convert the second target air-fuel ratio AFo2 from the target air-fuel ratio setting means 10 into the target air-fuel ratio AFo2' after correction for reflecting the temperature characteristics of the output voltage of the oxygen concentration sensor 5.

Figure 8:
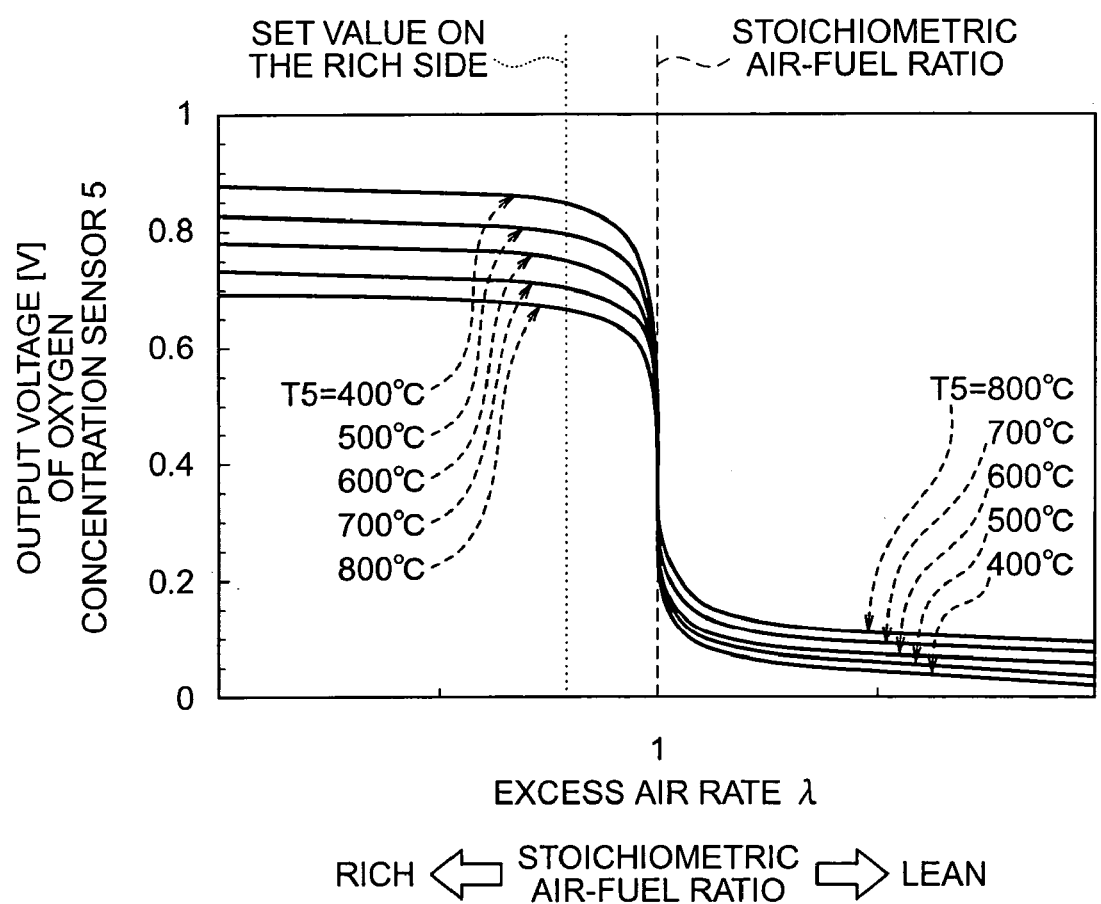
FIG. 8 is a graph showing temperature characteristics of an output voltage of an oxygen concentration sensor (λ-sensor) depending on an air-fuel ratio.

FIG. 8 is a graph showing temperature characteristics of the output voltage of the oxygen concentration sensor 5 depending on the air-fuel ratio. The oxygen concentration sensor 5 is $\lambda$-sensor having characteristics in which the output voltage is reversed sharply at the stoichiometric air-fuel ratio. FIG. 8 shows characteristic curves corresponding to respective device temperatures T5 (400° C. to 800° C.).

In FIG. 8, the horizontal axis indicates the air-fuel ratio at the position downstream of the catalyst 3, and the vertical axis indicates the output voltage of the oxygen concentration sensor 5.

Figure 9:
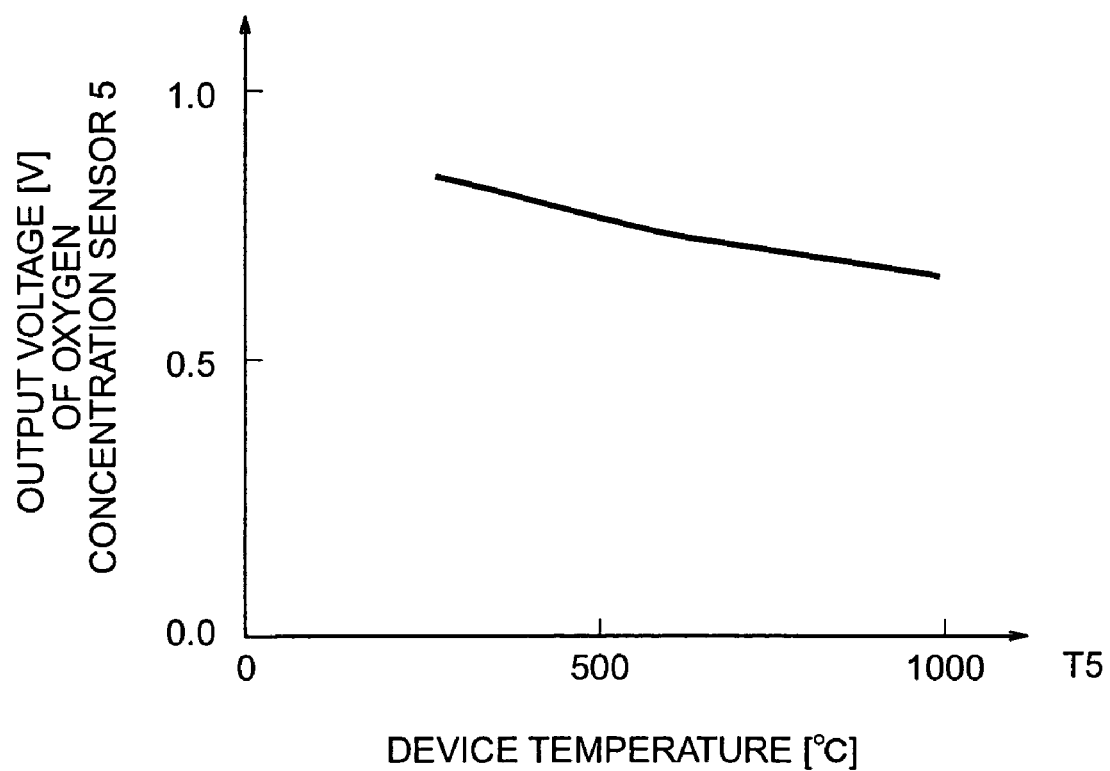
FIG. 9 is a graph showing the output voltage characteristics of FIG. 8 depending on a device temperature.

FIG. 9 is a graph showing the output voltage characteristics of FIG. 8 depending on the device temperature T5. In FIG. 9, the horizontal axis indicates the device temperature T5 [° C.] of the oxygen concentration sensor 5, and the vertical axis indicates the output voltage [V] of the oxygen concentration sensor 5 at the predetermined air-fuel ratio on the rich side (corresponding to the maximum NOx purification rate).

As can be seen from FIG. 9, the output voltage of the oxygen concentration sensor 5 decreases as the device temperature T5 increases.

Figure 10:
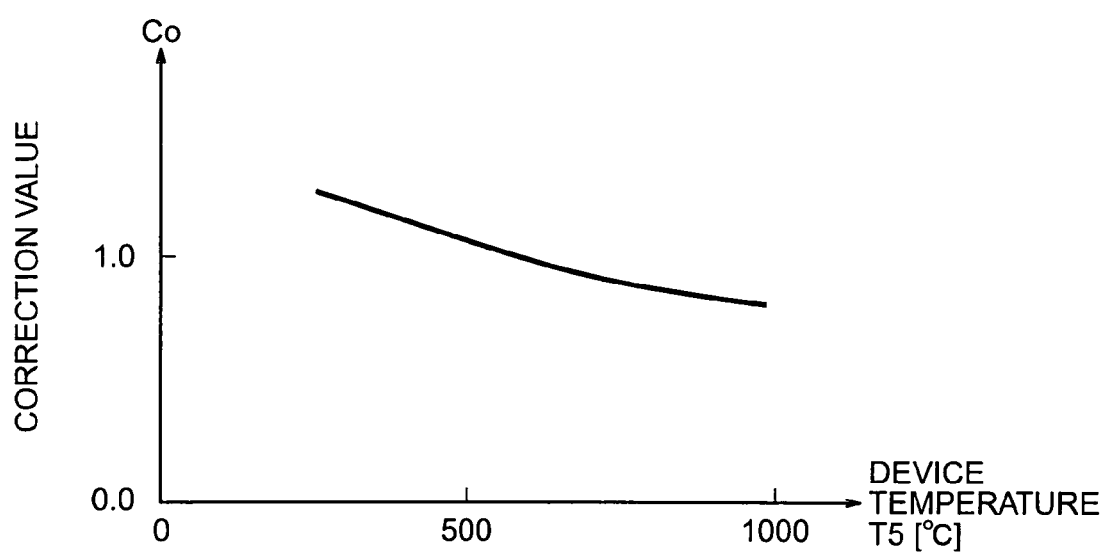
FIG. 10 is a graph showing a correction value determined based on the temperature characteristics of FIG. 9.

FIG. 10 is a graph showing the correction value Co determined based on the temperature characteristics of FIG. 9. The horizontal axis indicates the device temperature T5 and the vertical axis indicates the correction value Co.

In FIG. 10, the correction value Co for the second target air-fuel ratio AFo2 is set in correspondence with the device temperature 5 as a multiplication correction value. The correction value Co decreases as the device temperature T5 increases (as the output voltage of the oxygen concentration sensor 5 decreases).

Next, operation of the air-fuel ratio control according to the second embodiment shown in FIG. 7 will be described with reference to FIGS. 8 to 10.

As shown in FIG. 8, the output voltage characteristics of the oxygen concentration sensor 5 near the stoichiometric air-fuel ratio do not change substantially regardless of the device temperature T5. When the air-fuel ratio deviates from the stoichiometric air-fuel ratio, the output voltage changes (decreases) as the device temperature T5 increases.

Therefore, assuming that the second target air-fuel ratio AFo2 is set at a position near the stoichiometric air-fuel ratio, the sensor output characteristics do not change even if the device temperature T5 changes. Therefore, it is easy to control the air-fuel ratio at the position downstream of the catalyst 3 at the target value.

However, in the present invention, the second target air-fuel ratio AFo2 is set at the predetermined value on the rich side. Therefore, even if the air-fuel ratio is the same, the output characteristics of the oxygen concentration sensor 5 change depending on the device temperature T5 (see FIG. 8). Therefore, under this condition, it is not possible to control the air-fuel ratio at the position downstream of the catalyst 3 at a constant value accurately.

Therefore, in the second embodiment of the present invention, the following temperature compensation process is carried out by the target value correction means 101, 102 in the controller 6A.

That is, the correction value setting means 101 determines the correction value Co (see FIG. 10) based on the device temperature T5 considering the characteristics of the output voltage (see FIG. 9) of the oxygen concentration sensor 5 depending on the device multiplied by the correction value Co around a central value "1.0" to determine the target air-fuel ratio AFo2' after correction. Alternatively, the correction value may be added or subtracted to directly determine the target air-fuel ratio AFo2' after correction based on the table data in correspondence with the device temperature T5.

In order to obtain the information about the device temperature T5 of the oxygen concentration sensor 5 provided at the position downstream of the catalyst 3, a temperature sensor has been provided at the oxygen concentration sensor 5 (or around the oxygen concentration sensor 5). The actually measured value of the temperature has been directly used as the device temperature T5 to set the correction value Co in correspondence with the device temperature 5. Alternatively, the correction value setting means 101 may set the correction value Co using the relationship between the intake air amount and the device temperature T5 [° C.].

Figure 11:
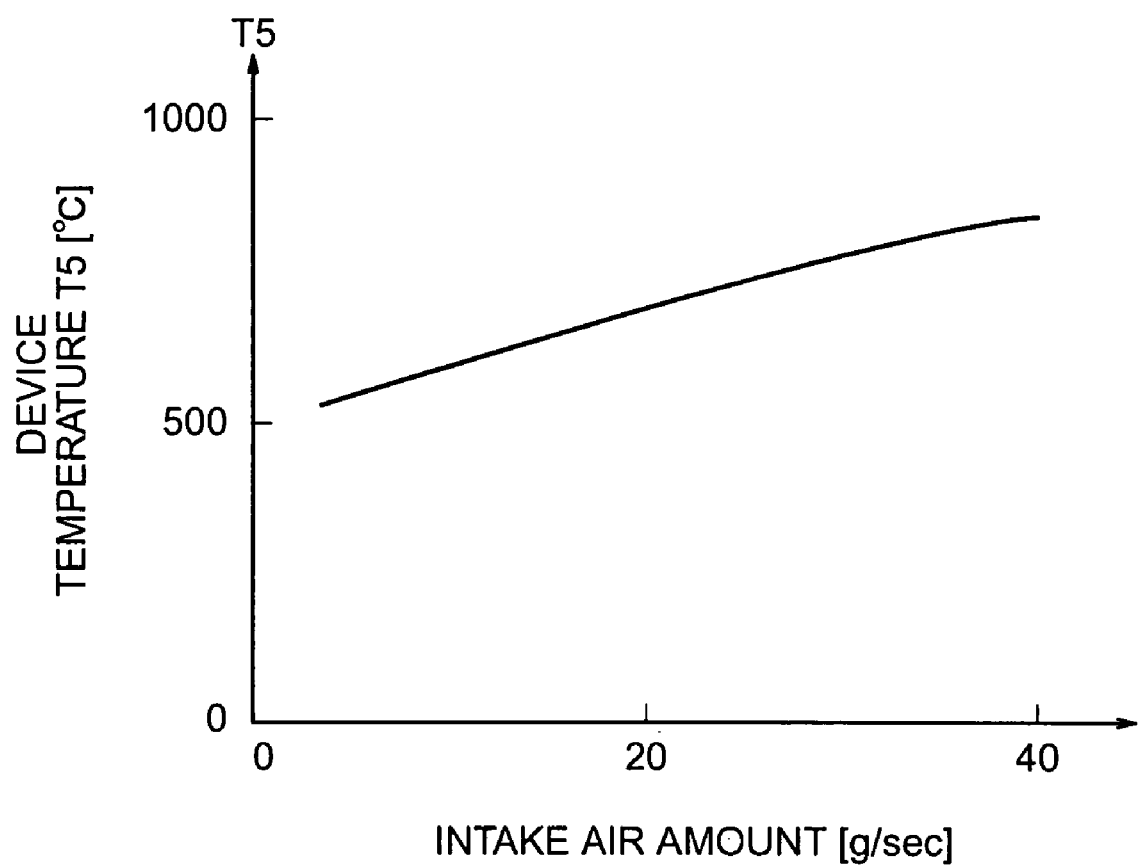
FIG. 11 is a graph showing a relationship between an intake air amount and the device temperature.

FIG. 11 is a graph showing the relationship between the intake air amount and the device temperature T5. FIG. 11 shows the correlation between the intake air amount [g/sec] and the device temperature T5 [° C.] which have been determined experimentally in advance.

Next, a description will be given of an example of calculation of the device temperature T5 by the correction value setting means 101 in the controller 6A using information about the intake air air amount and the device temperature T5. FIG. 11 shows the correlation between the intake air amount [g/sec] and the device temperature T5 [° C.] which have been determined experimentally in advance.

Next, a description will be given of an example of calculation of the device temperature T5 by the correction value setting means 101 in the controller 6A using information about the intake air amount obtained by the various sensors 12.

Typically, the various sensors 12 include an air flow sensor for detecting an intake air amount of the engine 1, and information indicating the intake air amount is inputted to the controller 6A.

Since the air-fuel ratio of the engine 1 is controlled at the predetermined value, the intake air amount is proportional to a fuel injection amount.

Since the exhaust gas temperature increases in proportion to the increase in the fuel injection amount, the device temperature T5 increases in proportion to the fuel injection amount (intake air amount).

Therefore, as shown in FIG. 11, the device temperature T5 is proportional to the intake air amount.

In this case, the controller 6A estimates the device temperature T5 in correspondence with the intake air amount based on the characteristics shown in FIG. 11.

Then, as described above, the correction value Co in correspondence with the device temperature T5 is calculated using the characteristics shown in FIG. 10, and the second target air-fuel ratio AFo2 is corrected.

In the same manner as described above, in the second embodiment according to the present invention, even if the device temperature T5 of the oxygen concentration sensor (λ-sensor) 5 changes, the air-fuel ratio at the position downstream of the catalyst 3 is controlled accurately. As a result, the purification rate of the exhaust gas is maintained at a high level.

Third Embodiment

In the second embodiment, the second target air-fuel ratio AFo2 has been corrected in correspondence with the device temperature T5 of the oxygen concentration sensor 5. Alternatively, the second target air-fuel ratio AFo2 may be corrected in correspondence with the operating condition of the engine 1.

Next, the third embodiment of the present invention will be described. In the third embodiment, the second target air-fuel ratio AFo2 is corrected in correspondence with the operating condition.

In this case, the structure of the controller 6A is the same as the structure shown in FIG. 7. The correction value setting means 101 (see FIG. 7) in the controller 6A sets the correction value Co for the second target air-fuel ratio AFo2 in correspondence with the operating condition (e.g., revolution number, charging efficiency) of the engine 1. The information about the operation condition of the engine 1 is obtained from the various sensors 12.

In FIG. 7, the target air-fuel ratio correction means including the correction value setting means 101 and the calculator 102 corrects the second target air-fuel ratio AFo2, for example, in correspondence with the operating condition.

The difference between the second embodiment and the third embodiment is only the method of setting the correction value Co for the second target air-fuel ratio AFo2.

Figure 12:
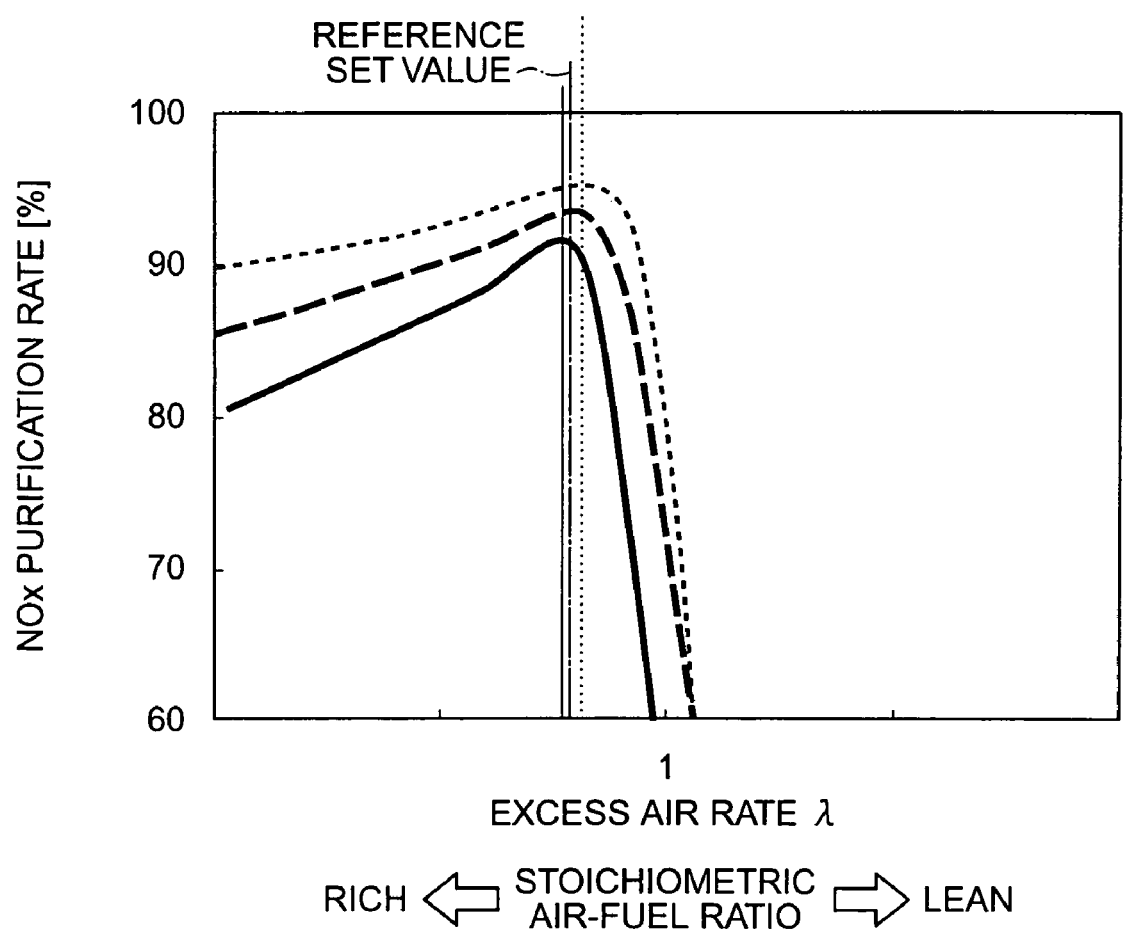
FIG. 12 is a graph showing the NOx purification characteristics of the catalyst after deterioration in different operating conditions.

FIG. 12 is a graph showing the NOx purification rate characteristics of the catalyst 3 after deterioration. FIG. 12 shows characteristic curves indicating a low load operating condition (see solid line) at a low revolution number and a low charging efficiency, a middle load operating condition (see broken line) at a middle revolution number and a middle charging efficiency, and a high load operating condition (see dotted line) at a high revolution number and a high charging efficiency, respectively.

As can be seen from FIG. 12, the value of the air-fuel ratio which achieves the maximum NOx purification rate changes depending on the operating condition. Therefore, by correcting the second target air-fuel ratio AFo2 in correspondence with the operating condition, it is possible to control the air-fuel ratio at the position downstream of the catalyst 3 such that the NOx purification rate of the catalyst 3 is always at the maximum level.

Figure 13:
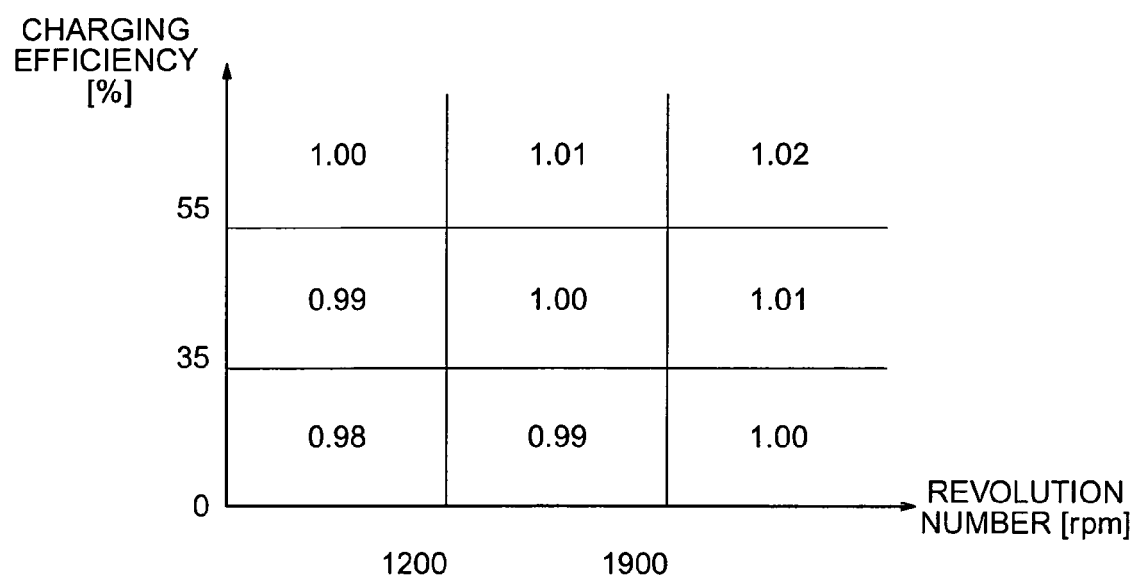
FIG. 13 is a graph showing correction values determined depending on an operating condition according to a third embodiment of the present invention.

FIG. 13 is a graph showing the correction value Co set in the third embodiment of the present invention.

In FIG. 13, the horizontal axis indicates the revolution number [rpm], and the vertical axis indicates the charging efficiency [%]. The correction value Co is set based on map data separated into blocks depending on the operating condition.

As shown in FIG. 13, the correction value Co is set at a value higher than "1.00" in the high load operating condition as the revolution number or the charging efficiency increases. The correction value Co is determined in correspondence with the NOx purification rate characteristics (see FIG. 12).

Next, operation of setting the correction value Co according to the third embodiment of the present invention will be described with reference to FIGS. 7, 12, and 13.

As well known in the art, main factors which affect the purification performance of the catalyst 3 are the exhaust gas flow rate, the exhaust gas component concentration, and the temperature.

Further, the amount of noble metal carried by the catalyst 3 is determined at a value which maintains the purification performance even if the exhaust gas flow rate is the maximum, the exhaust gas component is at the maximum concentration, and the catalyst temperature is the maximum.

Therefore, when the exhaust gas flow rate is less than the maximum value, the reaction amount of the catalyst 3 is low in comparison with the condition where the flow rate of the exhaust gas is the maximum. Therefore, the reaction heat of the catalyst 3 decreases, causing a difference in the purification performance of the catalyst 3.

Further, the reaction amount when concentration of the exhaust gas component is high is different from the reaction amount when the concentration of the exhaust gas is low. Therefore, the concentration of the exhaust gas component affects the temperature of the catalyst 3, and the temperature of the catalyst 3 affects the reaction of the catalyst 3.

Consequently, when the operating condition of the engine 1 changes, the factors which affect the purification performance of the catalyst 3 change, causing a difference in the purification performance of the catalyst 3.

Therefore, the engine revolution number and the charging efficiency corresponding to the load of the engine 1 are used as parameters indicating the operating condition of the engine 1 to correct the second target air-fuel ratio AFo2 such that the change in the Nox purification rate characteristics (see FIG. 12) of the catalyst 3 after the catalyst 3 is deteriorated in each of the operating conditions is offset.

The correction value setting means 101 in the controller 6A obtains information indicating the revolution number of the engine 1 and the charging efficiency from the various sensors 12. Then, the correction value setting means 101 reads, and sets the correction value Co (see FIG. 13) in each block in correspondence with the information about the revolution number and the charging efficiency.

Then, the calculator 102 carries out correction calculation for the second target air-fuel ratio AFo2 using the correction value Co (multiplication of the correction value Co in this case).

Therefore, the second target air-fuel ratio AFo2 is corrected in correspondence with the operating condition of the engine 1 to calculate the target air-fuel ratio AFo2' after correction. Therefore, the NOx purification rate of the exhaust gas is maintained at a high level even if the operating condition changes.

The correction shown in FIG. 13 is merely an example. It is a matter of course that arbitrary correction calculation can be carried out depending on various other operating conditions to achieve the similar effects and advantages.

Fourth Embodiment

In the first to third embodiments, though no specific set value of the second target air-fuel ratio AFo2 has been mentioned, the second target air-fuel ratio AFo2 may be set to a value corresponding to the voltage value near 0.75 V which is the most frequent output voltage of the oxygen concentration sensor 5.

Next, the fourth embodiment of the present invention will be described. In the fourth embodiment, the reference voltage value corresponding to the second target air-fuel ratio AFo2 is set at a value near 0.75 V.

In this case, the structure of the controller 6 is similar to the structure shown in FIG. 1, and only differs in that the voltage value of the second target air-fuel ratio AFo2 generated by the target air-fuel ratio setting means 10 in the controller 6 is specified.

That is, the target air-fuel ratio setting means 10 outputs a voltage value near 0.75 V as the reference voltage value corresponding to the second target air-fuel ratio AFo2 on the rich side of the stoichiometric air-fuel ratio (corresponding to the output voltage value of the oxygen concentration sensor ($\lambda$-sensor) 5). Thus, the NOx purification rate when the catalyst is deteriorated is the maximum at a temperature of 600° C.

Next, operation of setting the second target air-fuel ratio AFo2 according to the fourth embodiment of the present invention will be described with reference to FIGS. 14 and 15.

Figure 14:
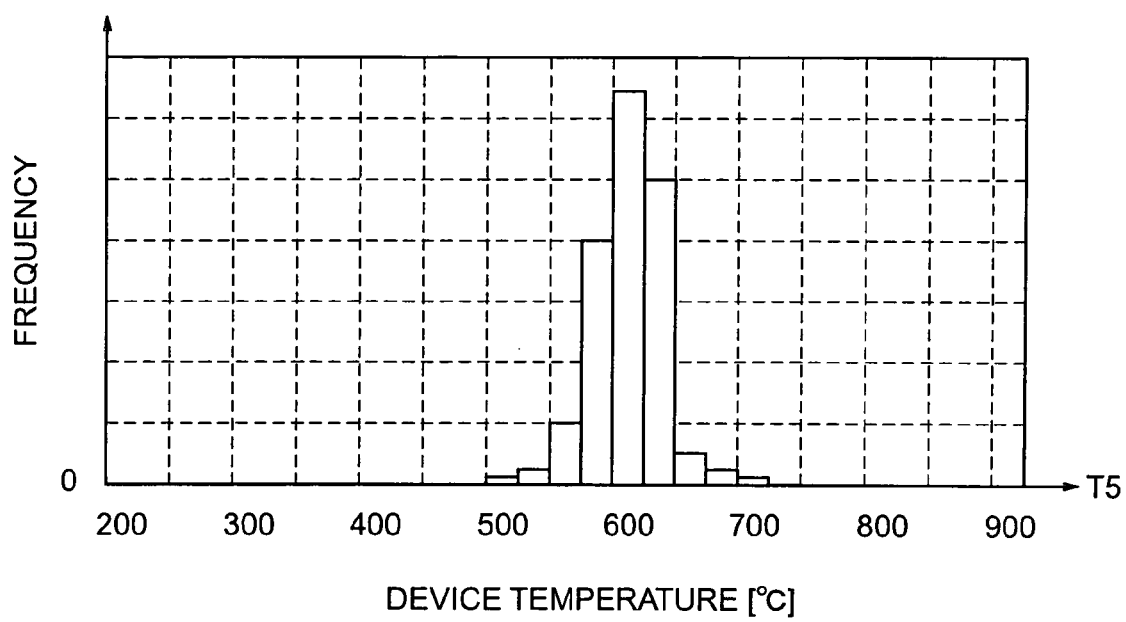
FIG. 14 is a view showing a frequency distribution of the device temperature of the oxygen concentration sensor (λ-sensor) during driving of a vehicle.

FIG. 14 is a view showing the frequency distribution of the device temperature T5 [° C.] of the oxygen concentration sensor ($\lambda$-sensor) 5 during the driving of a vehicle. FIG. 14 shows the frequency distribution of each device temperature T5 (200° C. to 900° C.) in the test pattern driving.

In FIG. 14, the frequency distribution is high when the device temperature T5 is near 600° C.

The test pattern used at the time of generating the frequency distribution shown in FIG. 14 emulates a typical driving pattern in the market. Therefore, it has been proven that substantially the same results can be obtained in the actual driving.

Figure 15:
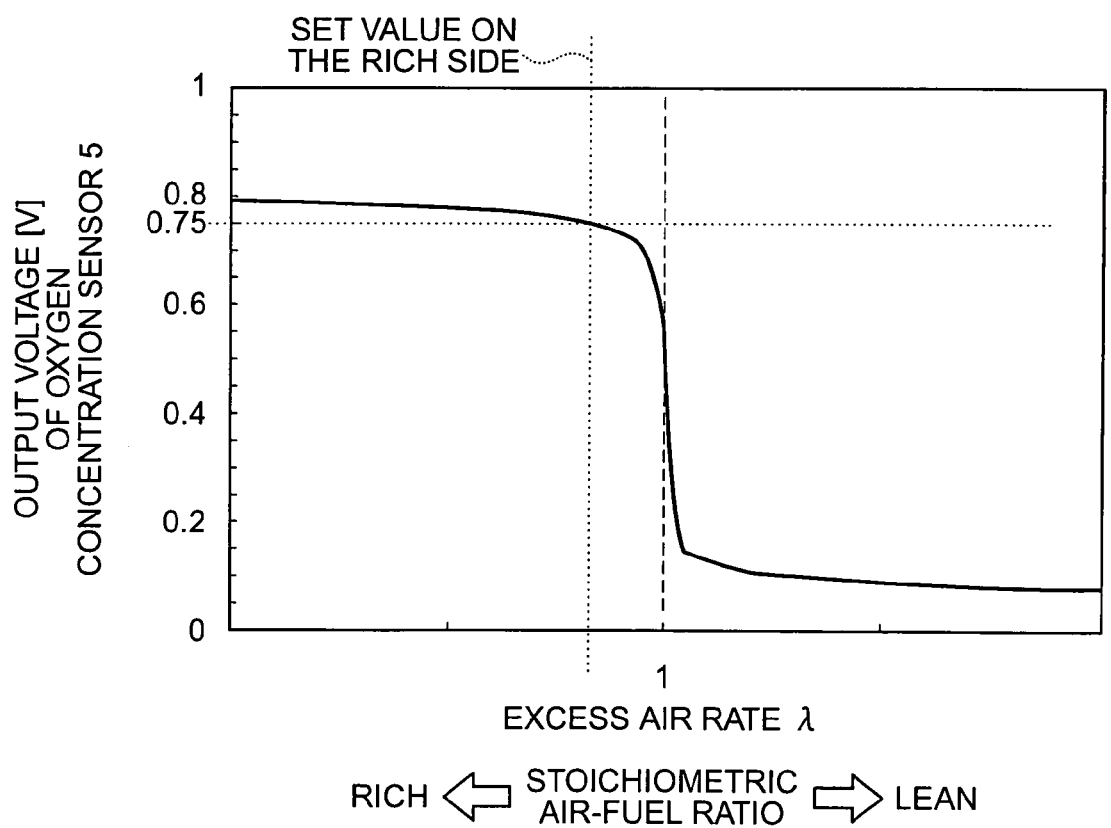
FIG. 15 is a graph showing output voltage characteristics of the oxygen concentration sensor (λ-sensor) at a device temperature of 600° C.

FIG. 15 is a graph showing output voltage characteristics of the oxygen concentration sensor ($\lambda$-sensor) 5. FIG. 15 shows a characteristic curve when the device temperature T5 is 600° C. which is the most frequent temperature during driving.

As can be seen from FIG. 15, at the target air-fuel ratio AFo2 corresponding to the high NOx purification rate (set value on the rich side), the output voltage of the oxygen concentration sensor ($\lambda$-sensor) 5 is about 0.75 V.

Therefore, by using the set value of the second target air-fuel ratio AFo2 at a value near 0.75 V, it is possible to control the air-fuel ratio such that the NOx purification rate of the catalyst 3 is the maximum at the most frequent device temperature T5 (=600° C.) during operation of the engine 1. Without any special correction means, it is possible to sufficiently improve the control performance of the air-fuel ratio.

The target value correction means 101, 102 (see FIG. 7) may be used for the reference voltage value near 0.75 V.

In the first to fourth embodiments, the linear sensor having linear output characteristics (see FIG. 3) for the change in the air-fuel ratio has been used as the oxygen concentration sensor 4 provided at the position upstream of the catalyst 3, and the λ-sensor having two-value output characteristics (see FIG. 2) for the change in the air-fuel ratio has been used as the oxygen concentration sensor 5 provided at the position downstream of the catalyst 3. Either of the linear sensor and the λ-sensor may be used as the oxygen concentration sensors 4 and 5. In either case, the similar effects and advantages are obtained.

In the embodiments, the PID controller 82 for carrying out proportion (P) calculation, integration (I) calculation, and differentiation (D) calculation has been used in the first air-fuel ratio control means 8, and the PI controller 92 for carrying out proportion (P) calculation and integration (I) calculation has been used in the second air-fuel ratio control means 9. It is a matter of course that only one of the proportion calculation, integration calculation, and differentiation calculation may be used, or more than one of these calculations may be used in combination. In either case, the similar effects and advantages are obtained.

What is claimed is:

1. An air-fuel ratio control apparatus for an internal combustion engine, comprising:

a catalyst, which is disposed in an exhaust air system for the internal combustion engine, for removing a toxic substance from an exhaust gas;

a first oxygen concentration sensor for detecting a first oxygen concentration in the exhaust gas at a position upstream of the catalyst;

a second oxygen concentration sensor for detecting a second oxygen concentration in the exhaust gas at a position downstream of the catalyst;

an injector for supplying a fuel to the internal combustion engine;

injector drive means for adjusting an amount of the fuel supplied from the injector to the internal combustion engine;

first air-fuel ratio control means for controlling the injector drive means such that a first air-fuel ratio corresponding to a detection signal from the first oxygen concentration sensor matches a first target air-fuel ratio;

second air-fuel ratio control means for setting the first target air-fuel ratio such that a second air-fuel ratio corresponding to a detection signal from the second oxygen concentration sensor matches a second target air-fuel ratio; and target air-fuel ratio setting means for setting the second target air-fuel ratio, wherein:

the target air-fuel ratio setting means stores a first predetermined value based on NOx purification rate characteristics of the catalyst depending on the air-fuel ratio in the exhaust air system for the internal combustion engine; and the target air-fuel ratio setting means sets the second target air-fuel ratio at the first predetermined value on a rich side of a stoichiometric air-fuel ratio such that an NOx purification rate is a maximum when the catalyst is in a deteriorated condition.

2. An air-fuel ratio control apparatus for an internal combustion engine according to claim 1, further comprising:

temperature detection means for detecting a temperature of the second oxygen concentration sensor; and target value correction means for correcting the second target air-fuel ratio depending on the temperature of the second oxygen concentration sensor, wherein:

the target value correction means stores a second predetermined value based on temperature characteristics of a detection signal from the second oxygen concentration sensor;

the target value correction means corrects the second target air-fuel ratio using the second predetermined value such that the temperature change in the detection signal from the second oxygen concentration sensor is offset; and the second target air-fuel ratio after correction is inputted to the second air-fuel ratio control means.

3. An air-fuel ratio control apparatus for an internal combustion engine according to claim 1, further comprising:

operating condition detection means for detecting an operating condition of the internal combustion engine; and target air-fuel ratio correction means for correcting the second target air-fuel ratio in correspondence with the operating condition.

4. An air-fuel ratio control apparatus for an internal combustion engine according to claim 1, wherein:

the second oxygen concentration sensor comprises a λ-sensor having two-value characteristics in which an output voltage changes sharply near the stoichiometric air-fuel ratio;

the target air-fuel ratio setting means outputs a voltage value near 0.75 V as a reference voltage in correspondence with the second target air-fuel ratio which is set at a value on the rich side of the stoichiometric air-fuel ratio such that the NOx purification rate is the maximum when the catalyst is in the deteriorated condition.

* * * * *